Dec. 4, 1934.  W. F. HEROLD  1,982,868
CASTER MOUNTING SOCKET
Filed Oct. 12, 1932
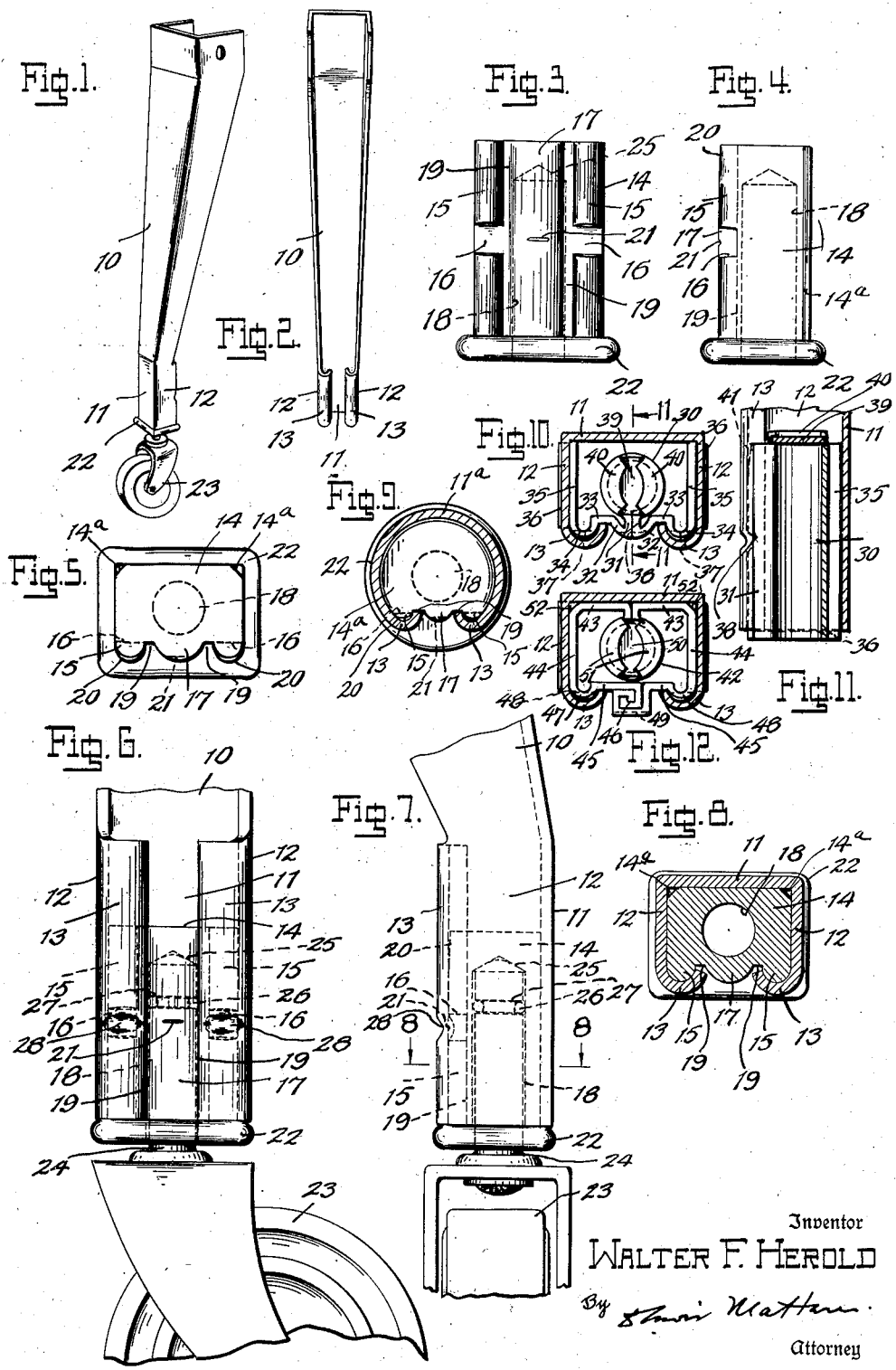
Inventor
WALTER F. HEROLD
By
Attorney Patented Dec. 4, 1934

1,982,868

UNITED STATES PATENT OFFICE 1,982,868

CASTER MOUNTING SOCKET

Walter F. Herold, Fairfield, Conn., assignor to The Bassick Company, Bridgeport, Conn., a corporation of Connecticut Application October 12, 1932, Serial No. 637,437

7 Claims. (Cl. 16—29)

The present invention relates to a caster mounting socket for furniture legs, particularly sheet metal or pressed steel channel legs of the type used upon stoves, refrigerators, and the like, and has for an object to provide a socket which may be easily and firmly attached without the use of rivets or bolts, and which will furthermore provide a solid brace and foot for the leg adapted to effectually support it against twisting, bending and distortion. A further object is to provide a socket which may be formed in one piece, ready for mounting in the leg without additional parts.

With the above and other objects in view an embodiment of the invention is shown in the accompanying drawing and this embodiment will be hereinafter more fully described with reference thereto and the invention will be finally pointed out in the claims.

In the drawing:

Fig. 1 is a perspective view of a pressed steel channel leg provided with a caster mounting socket, according to the present exemplary embodiment of the invention.

Fig. 2 is a perspective view of the rear side of the leg, the caster mounting socket not being shown.

Fig. 3 is a rear elevation of the caster mounting socket, according to one exemplary embodiment of the invention.

Fig. 4 is a side elevation thereof.

Fig. 5 is a top plan view.

Fig. 6 is a rear elevation of the lower end of the leg, and showing the caster mounting socket engaged therein, and the caster inserted in the socket.

Fig. 7 is a side elevation thereof.

Fig. 8 is a horizontal sectional view, taken along the line 8—8 of Fig. 7.

Fig. 9 is a top plan view of a modified form of caster mounting socket according to the invention, for use with a cylindrical type of tubular leg, the leg being shown in horizontal section.

Fig. 10 is a top plan view of a further modified form, for use with a leg similar in form to the first embodiment, and formed from sheet metal, the leg being shown in horizontal section.

Fig. 11 is a vertical sectional view taken along the line 11—11 of Fig. 10.

Fig. 12 is a top plan view of another modified form, also formed of sheet metal, the leg being shown in horizontal section.

Similar reference characters indicate corresponding parts throughout the several figures of the drawing.

Referring to the drawing the sheet metal or pressed steel channel leg 10 is provided at its lower end with a vertically disposed front portion 11 and side flanges 12—12. In the usual construction of leg these side flanges 12—12 have their rear edges exposed and in continuation of the rear edges of the side flanges of the leg. According to the present invention, the side flanges 12—12 are extended at their rear edges and are curled inwardly and forwardly to provide vertically disposed parallel hook portions 13—13 providing inwardly disposed vertically extending grooves adjacent the inner surfaces of the side flanges 12—12.

The caster mounting socket 14 is preferably in the form of a cast metal block of generally rectangular form, its front and side surfaces being proportioned so that they will fit snugly within the channel shape of the foot portion of the leg. Upon the rear face there are formed at each edge vertically disposed parallel projecting ribs 15—15, each provided intermediate their ends with a notch 16, and between these ribs there is provided a vertically extending bulged-out portion 17 which is principally intended to fill out and reinforce the metal surrounding the caster pintle receiving socket hole 18. A pair of vertically disposed grooves 19—19 separate the ribs 15—15 and the intermediate bulged-out portion 17 to provide interlocking guide-ways for receiving the edges of the portions 13—13 of the leg, and as will presently more fully appear. The upper end portions of the ribs 15—15 are slightly beveled, as at 20—20, so as to facilitate insertion of the socket in the leg. The bulged out portion 17 is provided in horizontal alignment with the notches 16—16 with a knick 21 adapted when the socket is inserted in the leg to indicate the relative position of the notches, as will presently more fully appear. The lower end of the socket is provided with a projecting base flange 22 adapted to abut the lower end of the leg and which not only provides an ornamental finish for the lower end of the leg but forms a floor engaging protective foot when the caster is disengaged from the socket. The forward corners of the socket are preferably beveled, as at 14ª to facilitate insertion and to insure a snug fit in the leg, the clearance provided by these beveled corners permitting the sides of the leg to be slightly flexed inwardly and outwardly, and also providing relief at the corners so that the sides may be drawn rearwardly to a slight extent in the case of the interior lateral front to rear dimensions of the leg being slightly less than the lateral front to rear dimensions of the insert member.

The caster 23 may be of any suitable type, and, as shown in the present illustration, is provided with a cylindrical pintle 24 adapted to be inserted in the socket hole 18 and to have top swiveling bearing therewith against the upper bearing end 25 of the hole. The caster pintle is removably retained in the socket by a split spring ring 26 disposed in an annular groove 27 in the pintle, and which ring frictionally engages the wall of the socket hole and permits swiveling movement of the caster pintle.

In order to assemble the caster mounting socket with the leg the same is inserted so that the ribs 15—15 engage the grooves formed by the hook portions 13—13 of the leg, and it is then driven into place. In this relation it will be seen that the socket firmly supports the channel shape of the leg against any bending or twisting strains, the engagement of the hook ends 13—13 in the grooves 19—19 providing a firm interlocking engagement which will prevent any possibility of the side flanges 12 being forced in either one way or the other. In order to permanently secure the socket in place the hook portions 13—13 are indented as at 28—28 into the notched portions 16—16 of the ribs 15—15. The knick will indicate the exact position of these notches so that the indentation can be accurately placed. These indentations may be made either by hand or in a suitable press, as may be well understood. It will be observed that the curled flanges 13—13 in combination with the inserted socket provide a closed foot portion for the leg entirely free of any sharp or projecting edges. It will be understood that the indentations may be dispensed with if desired, the socket being held merely by the drive fit.

In Fig. 9 I have shown a modified form of the invention for use with a cylindrical shaped tubular leg 11ª, provided at the rear side with vertically disposed hooked portions 13—13, similar to the hook portion 13 of the first embodiment. The caster mounting socket 14ᵇ is of cylindrical shape, but is otherwise substantially similar to the first embodiment, being provided at its base with an outwardly extending flange 22 and being provided at its rear side with ribs 15—15 for engaging the grooves provided by the hook portions 13—13 of the leg.

In Figs. 10 and 11 I have shown a further modified form of the invention formed from sheet metal, and comprising a tubular socket portion 30, forwardly bent flanges 31—31 contacting each other at the seam of the socket, outwardly bent rounded portions 32—32 forming a rib, similar to the rib 17 of the first embodiment, outwardly bent portions 33—33 forming vertically disposed grooves, forwardly and rearwardly bent rounded portions 34—34 forming vertically disposed ribs, and rearwardly bent side flanges 35—35. The portions 35—35 are provided at their lower ends with outwardly bent flanges 36—36 to engage the under surface of the leg.

The vertically disposed ribs 34—34 are provided with indentations 37—37 into which the hook portions of the leg are adapted to be indented, in a similar manner to the first embodiment, and the rib formed by the portions 31—31 is provided with a knick 38 in line with the indentations, so as to indicate their position when inserted in the leg. The tubular socket portion 30 is provided at its upper end with a top bearing plate 39 secured in place by bent over ears 40—40 provided at the upper end of the socket portion.

The upper ends of the ribs 34—34 are slightly beveled, as at 41—41, to facilitate insertion of the socket in the leg. As will be obvious the manner of inserting and securing the socket in the leg is similar to the first embodiment of the invention, as is also its cooperation with the leg to support the latter against inward and outward strains upon its side flanges.

In Fig. 12 I have shown a further modified form of the invention, also formed of sheet metal, comprising a tubular socket portion 42, outwardly bent portions 43—43 extending from the seam of the socket portion, rearwardly bent side portions 44—44, and inwardly bent portions 45—45 secured together by an interlocking bent joint 46. The portions 45—45 secured together by interlocking side portions 44—44 with vertically disposed rounded ribs 47—47 for engagement with hooked portions 13—13 of the leg. These portions 47 are provided with indentations 48—48 into which the portions 13—13 of the leg are adapted to be indented and the joint 46 is provided with a nick 49 to indicate the position of the indentations. The socket portion 42 is provided at its upper end with a top bearing plate 50 secured in place by bending over ears 51—51 provided upon the upper end of the socket portion. The forward corners are preferably beveled, as at 52.

I have illustrated and described preferred and satisfactory embodiment of the invention, but it is obvious that changes may be made therein, within the spirit and scope thereof, as defined in the appended claims.

Having thus described my invention what I claim and desire to secure by Letters Patent is:—

1. In combination with a sheet metal channel leg having front and side portions, the rearward edges of the side portions being bent inwardly and forwardly to provide vertically extending hook portions contiguous to each side and being spaced apart to provide an opening at the rear, a caster mounting insert-member having outwardly disposed front, rear and side surfaces inserted in the lower end of the channel leg with a force fit, means at the rear of said insert member disposed within said leg and interlocking with said hook portions of said leg to draw the sides of said leg rearwardly from the front and to prevent outward lateral displacement of said sides, the insert member disposed between said sides adapted to prevent inward lateral displacement of said sides.

2. In combination with a sheet metal channel leg having front and side portions, the rearward edges of the side portions being bent inwardly and forwardly to provide vertically extending hook portions contiguous to each side and being spaced apart to provide an opening at the rear, a caster mounting insert member having outwardly disposed front, rear and side surfaces inserted in the lower end of the channel leg with a force fit, a pair of spaced apart vertically extending ribs at the rear of said insert member respectively contiguous to the respective sides of said insert member disposed within said leg and cooperating with said hook portions of said leg to draw the sides of said leg rearwardly from the front and to prevent outward lateral displacement of said sides, the insert member disposed between said sides adapted to prevent inward lateral displacement of said sides.

3. In combination with a sheet metal channel leg having front and side portions, the rearward edges of the side portions being bent inwardly and forwardly to provide vertically extending hook portions contiguous to each side and being spaced apart to provide an opening at the rear, a caster mounting insert member having outwardly disposed front, rear and side surfaces inserted in the lower end of the channel leg with a force fit, a pair of spaced apart vertically extending ribs at the rear of said insert member respectively contiguous to the respective sides of said insert member disposed within said leg and cooperating with said hook portions of said leg to draw the sides of said leg rearwardly from the front and to prevent outward lateral displacement of said sides, the insert member disposed between said sides adapted to prevent inward lateral displacement of said sides, the entering end of said ribs being tapered upwardly and inwardly to engage within said leg with a wedge fit.

4. In combination with a sheet metal channel leg having front and side portions, the rearward edges of the side portions being bent inwardly and forwardly to provide vertically extending hook portions contiguous to each side and being spaced apart to provide an opening at the rear, a caster mounting insert member having outwardly disposed front, rear and side surfaces inserted in the lower end of the channel leg with a force fit, a pair of spaced apart vertically extending ribs at the rear of said insert member respectively contiguous to its respective sides disposed within said leg and cooperating with said hook portions of said leg to draw said sides rearwardly from the front and to prevent outward lateral displacement of said sides, the insert member having vertically extending cut out portions at the forward ends of its sides spaced from the interior surface of the leg to permit the sides of the leg to be drawn rearwardly from the front, the insert member disposed between said sides adapted to prevent inward lateral displacement of said sides.

5. In combination with a sheet metal channel leg having front and side portions, the rearward edges of the side portions being bent inwardly and forwardly to provide vertically extending hook portions contiguous to each side and being spaced apart to provide an opening at the rear, a caster mounting insert member having outwardly disposed front, rear and side surfaces inserted in the lower end of the channel leg with a force fit, a pair of spaced apart vertically extending ribs at the rear of said insert member respectively contiguous to the respective sides of said insert member disposed within said leg and cooperating with said hook portions of said leg to draw the sides of said leg rearwardly from the front and to prevent outward lateral displacement of said sides, the insert member disposed between said sides adapted to prevent inward lateral displacement of said sides, said ribs having an indentation and said hook portions being indented into said indentation to prevent vertical displacement of said insert member.

6. For use with a sheet metal channel leg having front and side portions, the rearward edges of the side portions being bent inwardly and forwardly to provide vertically extending hook portions contiguous to each side and being spaced apart to provide an opening at the rear, a caster mounting insert member having outwardly disposed front, rear and side surfaces adapted to be inserted in the lower end of the channel leg with a force fit, a pair of spaced apart vertically extending ribs at the rear of said insert member respectively contiguous to the respective sides of said insert member adapted to be disposed within said leg and to cooperate with said hook portions of said leg to draw the sides of said leg rearwardly from the front and to prevent outward lateral displacement of said sides, the insert member disposed between said sides adapted to prevent inward lateral displacement of said sides.

7. For use with a sheet metal channel leg having front and side portions, the rearward edges of the side portions being bent inwardly and forwardly to provide vertically extending hook portions contiguous to each side and being spaced apart to provide an opening at the rear, a caster mounting insert member having outwardly disposed front, rear and side surfaces adapted to be inserted in the lower end of the channel leg with a force fit, a pair of spaced apart vertically extending ribs at the rear of said insert member respectively contiguous to the respective sides of said insert member adapted to be disposed within said leg and to cooperate with said hook portions of said leg to draw the sides of said leg rearwardly from the front and to prevent outward lateral displacement of said sides, the insert member disposed between said sides adapted to prevent inward lateral displacement of said sides, the entering end of said ribs being tapered upwardly and inwardly to engage within said leg with a wedge fit.

WALTER F. HEROLD.